June 29, 1965  M. LIPSKI ETAL  3,191,452
POWER TRANSMISSION APPARATUS

Filed March 17, 1964  2 Sheets-Sheet 1

INVENTORS
MITCHELL LIPSKI
THOMAS ROMANEK
BY Bair, Freeman &
Molinare ATTORNEYS

INVENTORS
MITCHELL LIPSKI
THOMAS ROMANEK
BY Bair, Freeman &
Molinare ATTORNEYS

United States Patent Office 3,191,452
Patented June 29, 1965

3,191,452
POWER TRANSMISSION APPARATUS
Mitchell Lipski, 5270 W. 90th St., Oaklawn, Ill., and
Thomas Romanek, 5208 S. Troy St., Chicago, Ill.
Filed Mar. 17, 1964, Ser. No. 352,589
6 Claims. (Cl. 74—384)

This invention relates to a power transmission apparatus for operatively connecting a driven shaft to a drive shaft whether the two are in axial alignment or whether their axes are space apart.

One object of the invention is to provide such an apparatus so designed as to permit an operative connection between the drive and driven shafts in a minimum of time and which is in the form of a unit which transmits power from a driving motor or the like to any desired device connected to the output shaft of the apparatus.

Another object is to provide an apparatus which permits instant adjustment with respect to the distance between drive and driven shafts from a minimum (where the two rotate on the same axis) to a maximum distance between axes and to any intermediate distance between minimum and maximum.

Still another object is to provide a power transmission apparatus comprising a pair of elongated housings which are rotatable about a center shaft through both housings so that the angular relationship between the housings may be adjusted and thereby the drive shaft of one housing and the driven shaft of the other varied in distance apart.

A further object is to provide a suitable power transmission means between a drive shaft of one housing and the center shaft, and between the center shaft and the driven shaft of the other housing which may take the form of gears, belts and pulleys, chains and sprockets or the like, the housings forming an enclosure for the power transmission means to thus protect it as well as other objects from contact with the power transmission means.

Still a further object is to provide the housings of split character so that they may be opened and the gears, pulleys and/or sprockets changed for changing the ratio of rotation as between the drive shaft and the driven shaft in a convenient manner.

With these and other objects in view, our invention consists in the construction, arrangement and combination of the various parts of our power transmission apparatus, whereby the objects above contemplated are attained, as hereinafter more fully set forth, pointed out in our claims and illustrated in detail on the accompanying drawings, wherein:

Figure 1:
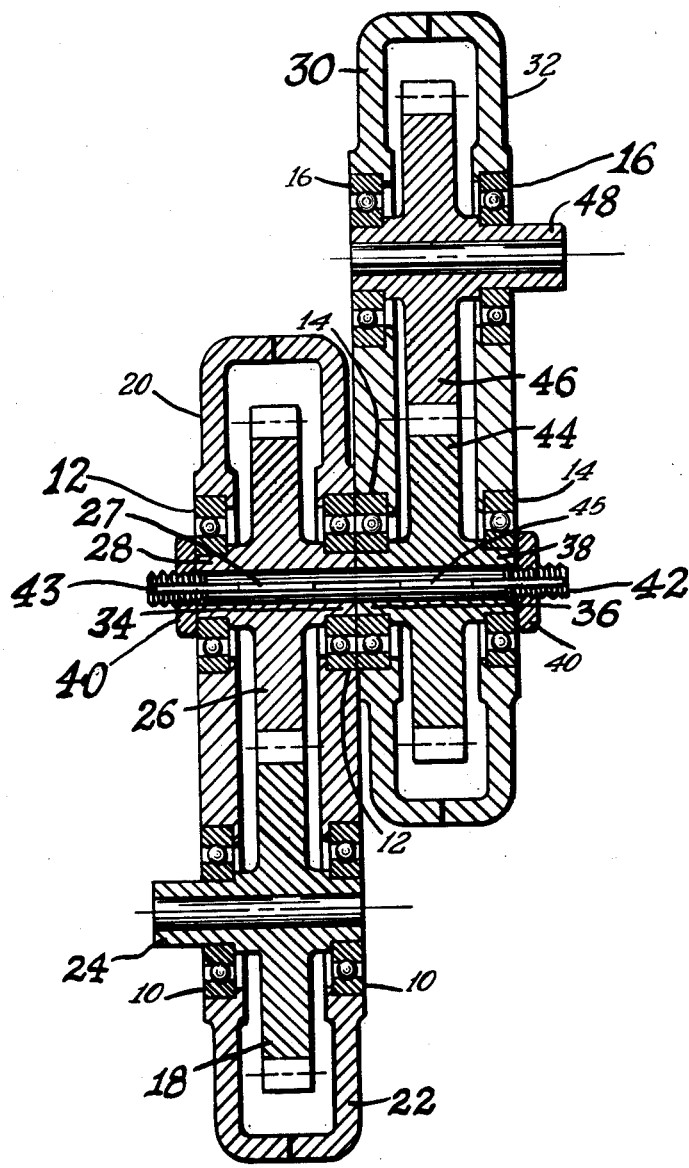
FIG. 1 is a sectional view through a power transmission apparatus embodying our invention.

On the accompanying drawings we have used the reference numerals 20 and 22 in FIG. 1 to indicate the left half and the right half, respectively, of a first housing, and 30 and 32 the left half and right half, respectively, of a second housing. The housing 20–22 has therein a drive gear 18 and an intermediate driven gear 26 meshing with each other. The housing 30–32 has an intermediate drive gear 44 and a final driven gear 46 therein meshing with each other.

Figure 2:
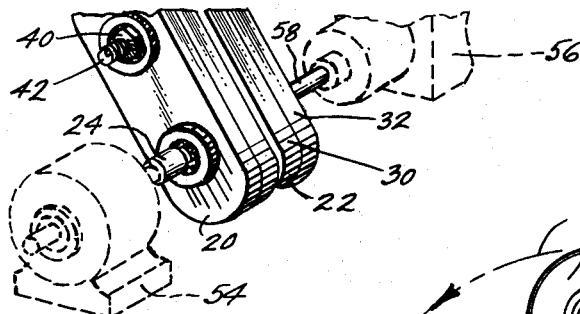
FIG. 2 is a perspective view thereof showing the same connected to a source of power and a device requiring the application of that power, the housings being adjusted to the position where the drive shaft and the driven shafts are in axial alignment.

The drive gear 18 has a drive shaft 24 which may be tubular to receive the shaft of a motor or the like such as shown at 54 in FIG. 2, the two shafts, of course, being suitably connected together for rotating the gear 18 from the motor. The drive shaft 24 is journaled in anti-friction bearings 10.

The intermediate driven gear 26 (FIG. 1) is provided with a left hub 28 and a right hub 34 which are journaled in anti-friction bearings 12. Similarly, the intermediate drive gear 44 has hubs 36 and 38 journaled in anti-friction bearings 14.

The final driven gear 46 has a driven shaft 48 journaled in anti-friction bearings 16. This shaft may also be tubular for connection to a shaft 58 of a device 56 to be driven as shown in FIG. 2.

Returning to FIG. 1 the gears 26 and 44 have a center shaft 42 extending therethrough and provided with nuts 40 against their hubs 28 and 38, the hubs 34 and 36 being in contact with each other. In order to insure a positive drive of the gear 46 from the gear 26 the shaft 42 is provided with a keyway 43 and the gears 26 and 44 are keyed thereto by means of keys 27 and 45, respectively.

The shaft 42 and the nuts 40 serve to retain the housings 20–22 and 30–32 closed by reason of the gears 26 and 44 being a fixed distance from each other and connected to the housings through the medium of the bearings 12 and 14. Accordingly, one of the nuts may be removed and the housings opened whereupon the gears 18, 26, 44 and 46 may be removed and other sets of gears substituted having different ratios of rotation as between the drive shaft 24 and the driven shaft 48. Thus, we provide a convenient means for quickly disassembling the power transmission apparatus disclosed and changing the gear ratio as desired whereupon the center shaft 42 and the nuts 40 may be reassembled as illustrated in FIG. 1 in a minimum of time and a convenient power transmission apparatus with possibility of a quick gear change is thereby had.

Figure 3:
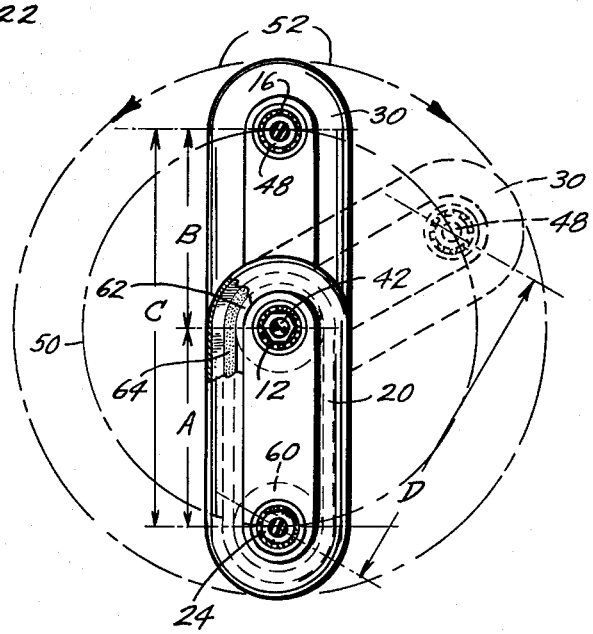
FIG. 3 is an elevation of our apparatus showing it adjusted to the maximum spread between drive and driven shafts and showing in dash lines one possible adjustment.
Figure 4:
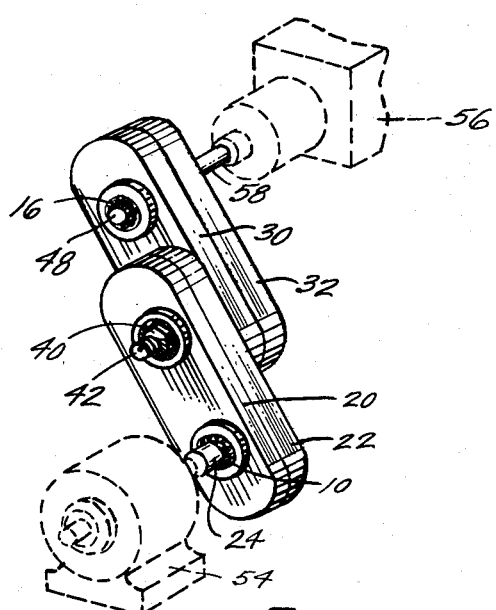
FIG. 4 is a perspective view similar to FIG. 2 showing the housings adjusted to the maximum position.

FIGS. 2, 3 and 4 illustrate comparatively narrow housings 20–22 and 30–32 suitable for pulley and belt or sprocket and chain types of installation. By way of example, in FIG. 3 pulleys 60 and 62 are illustrated and a belt 64.

FIG. 3 shows, in solid lines, the maximum adjusted position for our power transmission apparatus wherein the housings are aligned with each other and extend in opposite directions. Distances A and B are indicated from shaft 24 to shaft 42 and from shaft 42 to shaft 48. The distance A plus the distance B is equal to the distance indicated at C which is the maximum distance referred to. This is the adjustment illustrated in FIG. 4.

The upper housing in FIG. 3 may be adjusted as indicated by the arrow 52 throughout a full 360° of rotation. This causes the axis of the shaft 48 to swing on the center line 50 as to the dash line position shown wherein distance D is indicated between the drive shaft and the driven shaft. This distance is less than the distance C and obviously any desired angular adjustment may be had between the two housings to increase the distance D up to the distance C or decrease it to zero (when the drive and driven shafts are aligned as illustrated in FIG. 2). Since the housings have the bearings 12 and 14 surrounding the center shaft 42 they may be readily rotated in respect to each other for operatively connecting the device 56 to the motor 54 without the necessity of minute alignment adjustments except, of course, the axes of the motor 54 and the shaft 58 must be substantially parallel to prevent binding during operation. The motor 54 may, of course, be any source of power and the device 56 any tool, machine or the like requiring rotational input.

Our power transmission apparatus is so designed that gears, pulleys or sprockets may be interchanged as desired or required and speed ratios changed regardless of the type of power transmission from one shaft to the next. The angle between the housings can be adjusted to span the distance between the driving and driven shafts to permit the transmission of power from one to the other without the need for a universal joint or similar type of connection and is of definite advantage in those situations where it is desired to connect the shaft of a driving motor to a driven shaft wherein the two shafts are not in perfect axial alignment with each other.

From the foregoing specification it will be obvious that we have provided a power transmission apparatus in the form of a link between a drive shaft and a driven shaft which is capable of quick change in distance from one to the other and can be manipulated to change the gear ratio between the two shafts either step-up or step-down as desired. The two housings provide a floating covered safety protection for the gearing and may be provided with suitable gaskets and bearing seals to completely seal internal parts if desired. Instantaneous center locations are possible whatever the spacing between the motor shaft and the shaft 58 within the limit C in FIG. 3. The apparatus is light enough to be carried to the job for fast and inexpensive changeover or necessary overhauls with a minimum of dismantling of parts. The internal parts rotating between anti-friction bearings afford smooth and long-lasting performance with constant lubrication with either oil or grease if the housings are sealed as suggested.

Some changes may be made in the construction and arrangement of the parts of our power transmission apparatus without departing from the real spirit and purpose of our invention, and it is our intention to cover by our claims any modified forms of structure or use of mechanical equivalents which may reasonably be included within their scope.

We claim as our invention:

1. In a power transmission apparatus, a pair of elongated housings, a central shaft through both housings adjacent one end thereof, a drive shaft rotatable in one of said housings adjacent its other end, a driven shaft rotatable in the other of said housings adjacent its other end, and a pair of power transmission means, one enclosed within each of said housings and protected thereby from contact with foreign matter, said pair of power transmission means extending, one from said central shaft to said drive shaft and the other from said central shaft to said driven shaft, said housings being rotatable about said central shaft for varying the distance between the axes of said drive and driven shafts.

2. A power transmission apparatus in accordance with claim 1 wherein said housings are split in planes normal to the axes of said shafts to permit them to be opened whereby access to said pair of power transmission means is had, and means to retain the halves of said housings closed.

3. A power transmission apparatus in accordance with claim 2 wherein said last means is provided in the form of nuts threaded on the outer ends of said central shaft.

4. In a power transmission apparatus, a pair of elongated housings, a central shaft through both housings adjacent one end thereof, a drive shaft rotatable in one of said housings adjacent its other end, a driven shaft rotatable in the other of said housings adjacent its other end, and power transmission means in each of said housings from said central shaft to said drive and driven shafts, said housings being rotatable about said central shaft for varying the distance between the axes of said drive and driven shafts, said power transmission means comprising a pair of gears on said central shaft, and gears on said drive and driven shafts meshing therewith.

5. A power transmission apparatus in acordance with claim 4 wherein said housings are split to permit them to be opened whereby access to said gears is had to permit changing gears and thereby the speed ratio between said drive and driven gears, and means to retain the halves of said housings closed.

6. A power transmission apparatus in accordance with claim 5 wherein said means to retain the halves of said housings closed comprises a nut on said central shaft for confining the gears thereon against axial separation, and bearings in said housings for said last gears to confine the halves of said housings closed.

References Cited by the Examiner

UNITED STATES PATENTS 3,145,575   8/64   Bellman _____ 74—228

DON A. WAITE, *Primary Examiner.*